United States Patent Office 3,428,634
Patented Feb. 18, 1969

1

3,428,634
3-TERTIARY AMINO ALKOXY-1-
HYDROCARBON INDAZOLES
Giuseppe Palazzo, Rome, Italy, assignor to Aziende
Chimiche Riunite Angelini Francesco, Rome, Italy,
a corporation of Italy
No Drawing. Filed Sept. 8, 1965, Ser. No. 485,919
Claims priority, application Italy, Mar. 13, 1965,
5,587/65
U.S. Cl. 260—247.5         13 Claims
Int. Cl. C07d 87/40, 49/18; A61k 27/00

---

ABSTRACT OF THE DISCLOSURE

Indazole derivatives having N-hetero groups have antihelminthic activity and protect against gastric ulcerations. Such derivatives can be formed by reacting a haloalkylamine with an alkaline metal salt of a 3-hydroxy-indazole.

---

This invention relates to indazole derivatives having the general formula

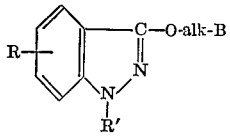

(I)

wherein

R is a member of the group consisting of hydrogen, lower alkyl, lower alkoxy, lower alkylmercapto, lower alkylsulphinyl, lower alkylsulphonyl, nitro, halogen, trifluoromethyl, and amino groups;

R' is a member of the group consisting of lower alkyl, phenyl, benzyl, halobenzyl, alkoxybenzyl, and phenethyl groups;

alk is a member of the group consisting of alkylene groups containing from two to six carbon atoms, with their free valences on different carbon atoms, and oxa-alkylene groups having from 4 to 8 carbon atoms;

B is a member of the group consisting of 1-pyrrolidino, alkylated 1-pyrrolidino, piperidino, alkylated piperidino, morpholino, alkylated morpholino, thiomorpholino, alkylated thiomorpholino, 1-piperazino, 4-methyl-1-piperazino, 4-phenyl-1-piperazino, 1-hexamethylenimino, and 1 - heptamethylenimino, and their pharmaceautically acceptable salts.

The indazoles of the general Formula I, which can be administered, for example, in the form of hydrochloride, phosphate, maleate, tartrate, benzylate, mandelate, formate, and pamoate, present interesting therapeutical characteristics. In fact, they possess remarkable antihelminthic activity, which was detected by using the K. Jentzsch and H. Ronge method (Arz. Forsch. 1956, 6, 639–647). Found to be particularly active were 1-benzyl-3-(γ-morpholino)propoxy-1H-indazole and 1-butyl-3-(γ-morpholino)propoxy - 1H - indazole, which were subsequently tested on dogs, which were carriers of "Dipilidium caninum," thus obtaining disinfestation by two or three days of treatment with doses of 25 mg./kg. per day.

It was also found that the substances have a high protective action against the gastric ulcerations obtained under the following experimental conditions:

(a) Ulcer according to Shay in the rat (Shay, H.; Ko-

2 marov, S. A.; Fels, S. S.; Meranze, D.; Gruenstein, M. and Siplet, H.—Gastroenterology, 1945, 5, 43);

(b) Ulcer by immobilization (Rossi, G.; Bonfils, S.; Lieffogh, F., and Lambling, A.—C. R. Soc. Biol. 1956, 150, 2124);

(c) Ulcer by phenylbutazone in the dog (Daskalaris, T.; Papacharalambous, N.; Chrysopathis, P.—Arch. Mal. Appar. Dig. 1956, 45, 116).

1 - phenethyl - 3 - (N' - methylpiperazino)propoxy-1H-indazole appeared to be particularly active. This action is even more interesting considering that it is disjointed from anticholinergic properties.

The indazoles of general Formula I may be prepared according to the invention by reacting haloalkylamines having the general formula

B—alk—hal         (II)

wherein B and alk have the meaning defined above, whereas hal represents a halogen atom, preferably chlorine or bromine, with alkaline metal salts of 3-hydroxy-indazoles having the general formula

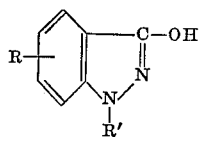

(III)

wherein R and R' have the meaning defined above. The reaction is carried out in inert solvents, and the alkaline metal salts of 3-hydroxy-indazoles can be either preformed, or formed in situ, for example by reacting with the stoichiometric amount of an alkaline metal alkoxide.

According to another embodiment of the preparation process, the haloalkylamines of Formula II can be reacted with 3-hydroxy-indazoles of general Formula II in the presence of a binding agent for hydrohalogenic acid, as a tertiary base.

The invention is illustrated, but not limited, by the following examples.

EXAMPLE 1

1-phenyl-3-(β-piperidino)ethoxy-1H-indazole 18.5 g. of sodium salt of 1-phenyl-3-hydroxy-1H-indazole are suspended in 200 cc. of toluene and heated to 110° C. In this suspension, while stirring, a solution of 17.5 g. of N-(β-chloroethyl)piperidine in 50 cc. of toluene is added dropwise during the period of an hour. After addition, the reaction mixture is heated for two additional hours. The reaction mixture is cooled, washed with water, and extracted with dilute HCl. The acidic solution is washed with ether and alkalized with 25% NaOH. The resultant mixture is extracted with ether, and the ethereal layers are washed and dried. By evaporating the solvent, 24 g. of oil are left. This base is converted into hydrochloride by dissolving it in ethyl acetate and by precipitating with the calculated amount of alcoholic hydrochloric acid. The substance melts at 190–2° C.

Analysis.—Calc. for $C_{20}H_{24}ClN_3O$: Cl, 9.91%. Found: Cl, 9.92%.

EXAMPLE 2

24.6 g. of sodium salt of 1-benzyl-3-hydroxy-1H-indazole are suspended in 200 cc. of toluene. The mixture is heated to ebullition and with stirring a solution of 18 g.

of N-(γ-chloropropyl)piperidine in 50 cc. of toluene is dropped therein during a period of 45 minutes. After refluxing for an additional three hours, the toluene solution is cooled, washed with water, extracted with dilute hydrochloric acid and the hydrochloric solution is alkalized with potassium hydroxide. The separated oil is taken up in ether, and the ethereal solution is washed with water and carefully dried. By adding alcoholic HCl in a stoichiometric amount the 1-benzyl-3-(γ-piperidino)-propoxy-1H-indazole hydrochloride, M.P. 182–184° C., is obtained. The analytical data is consistent with the calculated data.

EXAMPLE 3

1-benzyl-3-(γ-morpholino)propoxy-1H-indazole 22.4 g. of 1-benzyl-3-hydroxy-1H-indazole in 200 cc. of dimethylsulphoxide are treated under nitrogen atmosphere with 2.4 g. of sodium hydride in an oily suspension. The mixture is stirred for one hour at room temperature in order to achieve complete salification and then 20.2 g. of γ-chloropropyl-morpholine are added. The mixture is heated for 2 to 3 hours at 95–100° C. A great part of the solvent is removed under reduced pressure and the remainder is treated with dilute sulphuric acid and ether. The base is free from the acidic solution by alkalinization with potassium carbonate. The mixture is extracted with ether and the 1-benzyl-3-(γ-morpholino)propoxy-1H-indazole hydrochloride is precipitated with ethereal hydrochloric acid. Yield 50%. The substance, crystallized from alcohol, presents a melting point of 159° C.

By following the procedure set forth in the above examples, the following compounds are prepared, which are illustrative of the invention:

1-benzyl-3-(β-piperidino)ethoxy-1H-indazole:
 B.P. 208° C./0.3 mm. Hg
 HCl M.P., 132° C.
1-benzyl-3-(γ-morpholino)propoxy-1H-indazole:
 HCl M.P., 159° C.
1-butyl-3-(γ-morpholino)propoxy-1H-indazole:
 B.P. 167° C./0.2 mm. Hg
 HCl M.P., 127° C.
1-methyl-3-(β-morpholino)ethoxy-1H-indazole:
 HCl M.P., 208–10° C.
1-benzyl-3-(N'-methylpiperazino)propoxy-1H-indazole: M.P., 2224–4° C.
1-phenethyl-3-(N'-methylpiperazino)propoxy-1H-indazole: M.P., 224–6° C.
1-butyl-3-(γ-pyrrolidino)propoxy-5-chloro-1H-indazole: M.P. 138–40° C.
1-o.chlorobenzyl-3-(β-morpholino)-ethoxy-1H-indazole: M.P., 190–2° C.
1-phenyl-3-(γ-morpholino-β-methyl)-ethoxy-1H-indazole: HCl M.P., 225–7° C.
1-(m,p.dimethoxy)-benzyl-3-(γ-morpholino)propoxy-1H-indazole: HCl M.P., 179–81° C.

What we claim is:
1. A compound having the structural formula

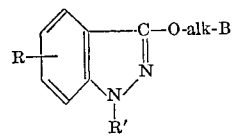

wherein
 R is hydrogen or halogen;
 R' is selected from the group consisting of alkyl having from 1 to 4 carbon atoms, phenyl, benzyl, chlorobenzyl, dimethoxybenzyl, and phenethyl;
 alk is an alkylene group having two or three carbon atoms having the free valences on different carbon atoms;
 B is selected from the group consisting of pyrrolidino, piperidino, morpholino, piperazino, and 4-methylpiperazino,
or pharmaceutically acceptable acid addition salts thereof.
 2. 1-phenyl-(β-piperidino)ethoxy-1H-indazole.
 3. 1-benzyl-3-(γ-piperidino)propoxy-1H-indazole.
 4. 1-benzyl-3-(γ-morpholino)propoxy-1H-indazole.
 5. 1-benzyl-3-(β-piperidino)ethoxy-1H-indazole.
 6. 1-butyl-3-(γ-morpholino)propoxy-1H-indazole.
 7. 1-methyl-3-(β-morpholino)ethoxy-1H-indazole.
 8. 1 - benzyl-3-(γ-N'-methylpiperazino)propoxy - 1H-indazole.
 9. 1 - phenyl-3-(γ-N'-methylpiperazino)propoxy - 1H-indazole.
 9. 1 - phenyl-3-(γ-N'-methylpiperazino)propoxy - 1H-indazole.
 10. 1 - butyl-3(γ-pyrrolidino)propoxy-5-chloro - 1H-indazole.
 11. 1 - o.chlorobenzyl-3-(β-morpholino)ethoxy - 1H-indazole.
 12. 1 - phenyl-3-(γ-morpholino-β-methyl)ethoxy - 1H-indazole.
 13. 1-(m.p.dimethoxy)benzyl - 3 - (γ - morpholino)propoxy-H-indazole.

References Cited

FOREIGN PATENTS 1,382,855  12/1964  France.

ALEX MAZEL, Primary Examiner.
J. TOVAR, Assistant Examiner.

U.S. Cl. X.R.

260—310, 311, 268, 294.7; 424—248–250, 263

UNITED STATES PATENT OFFICE
CERTIFICATE OF CORRECTION

Patent No. 3,428,634                                           February 18, 1969

Giuseppe Palazzo

It is certified that error appears in the above identified patent and that said Letters Patent are hereby corrected as shown below:

Column 1, line 59, after "tested" insert -- also --. Column 2, line 36, after "Formula" cancel "II" and insert -- III --. Column 3, line 45, "2224-4' should read -- 222-4 --. Column 4, line 32, after "1-" cancel "phenyl" and insert -- phenethyl --; same column 4, lines 34 and 35, cancel "9. 1-phenyl-s-(γ-N'-methylpiperazino) propoxy-1H-indazole."; line 43, before "H" insert -- 1 --.

Signed and sealed this 31st day of March 1970.

(SEAL)
Attest:

Edward M. Fletcher, Jr.                                WILLIAM E. SCHUYLER, JR.

Attesting Officer                                                    Commissioner of Patents